US009604718B2

(12) United States Patent
Lissajoux et al.

(10) Patent No.: US 9,604,718 B2
(45) Date of Patent: Mar. 28, 2017

(54) METHOD AND DEVICE FOR GENERATING AT LEAST ONE SET POINT FROM A FLIGHT CONTROL SET POINT, A MOTOR CONTROL SET POINT AND AN AIRCRAFT GUIDANCE SET POINT, RELATED COMPUTER PROGRAM PRODUCT AND AIRCRAFT

(71) Applicant: THALES, Courbevoie (FR)

(72) Inventors: Sylvain Lissajoux, Toulouse (FR); Eric Guillouet, Toulouse (FR); Thibaut Debard, Toulouse (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/740,023

(22) Filed: Jun. 15, 2015

(65) Prior Publication Data

US 2015/0360767 A1   Dec. 17, 2015

(30) Foreign Application Priority Data

Jun. 16, 2014 (FR) ..................... 14 01359

(51) Int. Cl.
*G05D 1/00*     (2006.01)
*G05B 19/18*    (2006.01)
*B64C 13/22*    (2006.01)
*B64C 13/04*    (2006.01)
*B64C 13/18*    (2006.01)
(Continued)

(52) U.S. Cl.
CPC .............. *B64C 13/22* (2013.01); *B64C 13/04* (2013.01); *B64C 13/18* (2013.01); *B64D 31/00* (2013.01); *B64D 31/04* (2013.01); *B64D 31/06* (2013.01); *G05D 1/0061* (2013.01)

(58) Field of Classification Search
USPC ................................. 701/6; 700/63
See application file for complete search history.

(56) References Cited

U.S. PATENT DOCUMENTS 5,978,715 A    11/1999  Briffe et al.
2005/0080495 A1*  4/2005  Tessier ................... B64C 13/04
                                                 700/63
(Continued)

OTHER PUBLICATIONS

Embraer 135-145 Airplane Operations Manual Section 2-19 Autopilot, Dec. 20, 2002, XP055180937.
(Continued)

*Primary Examiner* — Tyler Paige
(74) *Attorney, Agent, or Firm* — Knobbe, Martens, Olson & Bear, LLP

(57) ABSTRACT

A method and device for generating at least one set point from a flight control set point, a motor control set point and an aircraft guidance set point, a related computer program product and an aircraft are disclosed. In one aspect, the method includes acquiring a mechanical property relative to at least one corresponding primary control member and computing at least one set point from among one or more primary set points and one or more secondary set points. The method also includes generating at least one of the computed set point(s) and switching, based on the mechanical property acquired for the corresponding primary control member, between a first mode in which one or more primary set points are generated and a second mode in which one or more secondary set points are generated.

17 Claims, 7 Drawing Sheets

(51) Int. Cl.
*B64D 31/04* (2006.01)
*B64D 31/06* (2006.01)
*B64D 31/00* (2006.01)

(56) References Cited

U.S. PATENT DOCUMENTS

| | | | |
|---|---|---|---|
| 2009/0105890 A1* | 4/2009 | Jones | G01C 23/00 |
| | | | 701/1 |
| 2010/0123045 A1 | 5/2010 | Grieser | |
| 2011/0118908 A1* | 5/2011 | Boorman | G08G 5/0021 |
| | | | 701/14 |
| 2012/0101663 A1* | 4/2012 | Fervel | B64C 13/42 |
| | | | 701/3 |
| 2012/0153074 A1 | 6/2012 | Nannoni et al. | |
| 2012/0255386 A1* | 10/2012 | Couderc | B64C 13/30 |
| | | | 74/471 XY |
| 2012/0290153 A1* | 11/2012 | Olsoe | B64C 13/42 |
| | | | 701/3 |
| 2013/0138274 A1* | 5/2013 | Caldeira | G05D 1/0676 |
| | | | 701/16 |

OTHER PUBLICATIONS

Search Report dated Apr. 9, 2015 for French Patent Application No. 1401359 filed Jun. 16, 2014.

* cited by examiner

METHOD AND DEVICE FOR GENERATING AT LEAST ONE SET POINT FROM A FLIGHT CONTROL SET POINT, A MOTOR CONTROL SET POINT AND AN AIRCRAFT GUIDANCE SET POINT, RELATED COMPUTER PROGRAM PRODUCT AND AIRCRAFT

CROSS-REFERENCE TO RELATED APPLICATIONS

This application claims benefit under 35 U.S.C. §119 of French Application No. 14 01359, filed Jun. 16, 2014, which is herein incorporated by reference in its entirety.

BACKGROUND

Technological Field

The described technology generally relates to a method for generating at least one set point from among a primary set point and a secondary set point, the primary set point being chosen from among a flight control set point for a flight control system of an aircraft and an engine control set point for an engine control unit of the aircraft, the secondary set point being a guidance set point for a guidance system of the aircraft.

Description of the Related Technology

"Short term" generally refers to a time period of up to 30 seconds from the moment when the primary control member is manipulated by a user, such as a member of the crew. "Middle term" generally refers to a time period of 30 seconds to several minutes from the manipulation moment of the primary control member.

The avionics system associated with the short-term piloting is the flight control system (FCS) or the engine control unit (ECU), and the avionics system associated with middle-term piloting is a guidance system, such as the automatic pilot (AP) of the aircraft, or the auto-flight control system (AFCS), or an auto-thrust device, also called automatic throttle, or a flight management system (FMS) of the aircraft.

Traditionally, the pilot of an aircraft commands the apparatus by using one or more primary control members, generally a control stick and/or a throttle. By actuating each primary control member, the pilot generates a change in attitude of the aircraft, or causes an increase in the thrust of the reactors of the apparatus, which results in modifying the path of the aircraft.

The crew of the aircraft indicates the guidance set points to the guidance system in order to define the middle-term path using a dedicated control station in the cockpit. This control station for defining the guidance set points generally assumes the form of a control panel.

Document U.S. Pat. No. 5,978,715 A describes a flight conduct system including a generating device of the aforementioned type. The piloting station of the aircraft comprises a control stick to command a change in attitude of the aircraft and a throttle to vary the thrust of the reactors. The control station also comprises a control switch with several axes and five positions, positioned at the apex of the control stick and able to be maneuvered by the thumb.

This switch is used to vary the value of the heading and gradient of the flight path followed by the automatic pilot. A sideways movement modifies the heading or route, and a front-to-back movement modifies the gradient. Pressure on the switch in its central position generates a validation signal that selects the heading and gradient followed by the automatic pilot.

However, such a flight conduct system is relatively complex to use by a crew for the short-term and middle-term piloting of the aircraft.

SUMMARY OF CERTAIN INVENTIVE ASPECTS

One objective of certain inventive aspects is therefore to propose a method and device for generating at least one set point from among the primary set point and secondary set point making it possible to facilitate, for the crew, the development of primary set points and secondary set points, while limiting the number of control members associated with that development of the set points.

To that end, one inventive aspect relates to a method of the aforementioned type, wherein the method further comprises switching, based on the mechanical property acquired for each primary control member, between a first mode in which one or more primary set points are generated and a second mode in which one or more secondary set points are generated.

The generating method according to certain aspects then makes it possible, using a same control member, i.e., the corresponding primary control member, such as the control stick or mini control stick, the throttle or the rudder bar, to switch between a first operating mode in which primary set points are generated and a second operating mode in which secondary set points are generated, and following that switching, to vary the associated set point value as needed.

The method according to certain aspects is implemented by an electronic device for generating the set point and comprises acquiring a mechanical property relative to at least one primary control member, computing at least one set point from among one or more primary set points and one or more secondary set points, and generating at least one of the computed set point(s), intended for the corresponding system from among the flight control system, the engine control unit and the guidance system.

Another aspect also relates to a computer-readable medium including a computer program product including software instructions which, when they are implemented by a computer, carry out such a method.

Another aspect also relates to an electronic device for generating such a set point.

Another aspect also relates to an aircraft comprising a flight control system, an engine control unit, at least one guidance system, at least one primary control member, such as a control stick or mini control stick, a rudder bar or a throttle, each primary control member being able to be manipulated by a user to pilot the aircraft, and such a generating device.

Another aspect applies to the field of avionics, and more particularly to the field of flight conduct systems and their interfaces with the crew. The described technology more specifically relates to the interfaces via which the crew of an aircraft will send avionics systems their short-term and middle-term piloting intentions.

According to other aspects, the method includes one or more of the following features, considered alone or according to all technically possible combinations: the aircraft comprises a plurality of primary control members, mechanical properties are acquired for the plurality of primary control members, and the switching between the first mode and the second mode is done for each primary control member and as a function of the mechanical property acquired for the corresponding primary control member; at least one primary control member is movable in at least two different movement directions, and the switching between the first mode and the second mode is done for each movement direction of the corresponding primary member and as a function of the mechanical property acquired for the member in the corresponding movement direction; both a primary set point and a secondary set point are computed during the computation step, and the switching between the first mode and the second mode is done via the selection, by the computed primary set point and the computed secondary set point, of the set point corresponding to the mode toward which the switching is done, then via the generation of the selected set point; the switching to the first mode, the second mode, respectively, is done for a first range of values of the acquired mechanical property, a second value range of the mechanical property, respectively, the second range being different from the first range; the second range desirably being separate from the first range; the values of the second range are lower than those of the first range; the mechanical property is a property chosen from among the group including: a position of the corresponding primary control member, a movement speed of the corresponding primary member and a mechanical force applied against the corresponding primary control member; the method further comprises the determination of at least one aeronautic property from among a position of the aircraft, attitudes of the aircraft, order 1 and 2 time derivatives of the position and attitudes, the airspeed of the aircraft and the angle of attack of the aircraft, and the switching from the first mode to the second mode is authorized only if the value of each determined property is comprised in a corresponding predetermined value range; during the generating step, if the deviation between the computed set point and a predetermined reference set point is below a predetermined threshold, then the generated set point is the predetermined reference set point; at least one primary control member is a member with controllable mechanical force feedback, and the law of the mechanical force feedback supplied by the corresponding primary member as a function of the travel of the primary member relative to an idle position includes at least one nonlinearity, to favor the convergence of the generated set point toward a predetermined reference set point; and each guidance system is an element chosen from among the group including: an automatic pilot device, an auto-thrust device and a flight management system of the aircraft.

Another aspect also relates to a computer-readable medium including a computer program product including software instructions which, when implemented by a computer, carry out the method as defined above.

Another aspect also relates to an electronic device for generating at least one set point from among a primary set point and a secondary set point, the primary set point being chosen from among a flight control set point for a flight control system of an aircraft and an engine control set point for an engine control unit of the aircraft, the secondary set point being a guidance set point for a guidance system of the aircraft, the device comprising: an acquiring capability for acquiring a mechanical property relative to at least one primary control member, such as a control stick or mini control stick, a rudder bar or a throttle, each primary control member being able to be manipulated by a user to pilot the aircraft, a first module for computing at least one primary set point, a second module for computing at least one secondary set point, a generating module for generating, to the corresponding system from among the flight control system and the guidance system, at least one set point computed by a module from among the first computation module and the second computation module, wherein the device further comprises a switching capability for switching, as a function of the mechanical property acquired for each primary control member, between a first mode in which the generating module is configured for generating one or more primary set points and a second mode in which the generating module is configured for generating one or more secondary set points.

Another aspect also relates to an aircraft, such as an airplane, comprising a flight control system, an engine control unit, at least one guidance system, such as an automatic pilot device, or an auto-thrust device, or a flight management system, at least one primary control member, such as a control stick or a mini control stick, a throttle or a rudder bar, each primary control member being able to be manipulated by a user to pilot the aircraft, and an electronic device for generating at least one set point from among a primary set point and a secondary set point, the primary set point being chosen from among a flight control set point for the flight control system and an engine control set point for an engine control unit of the aircraft, the secondary set point being a guidance set point for the corresponding guidance system, in which the generating device is as defined above.

BRIEF DESCRIPTION OF THE DRAWINGS

These features and advantages of the described technology will become apparent upon reading the following description, provided solely as a non-limiting example, and done in reference to the appended drawings, in which.

DETAILED DESCRIPTION OF CERTAIN INVENTIVE EMBODIMENTS

By convention in the present application, the expressions "substantially equal to" and "approximately" will each express a relationship of equality to within plus or minus 10%.

Figure 1:
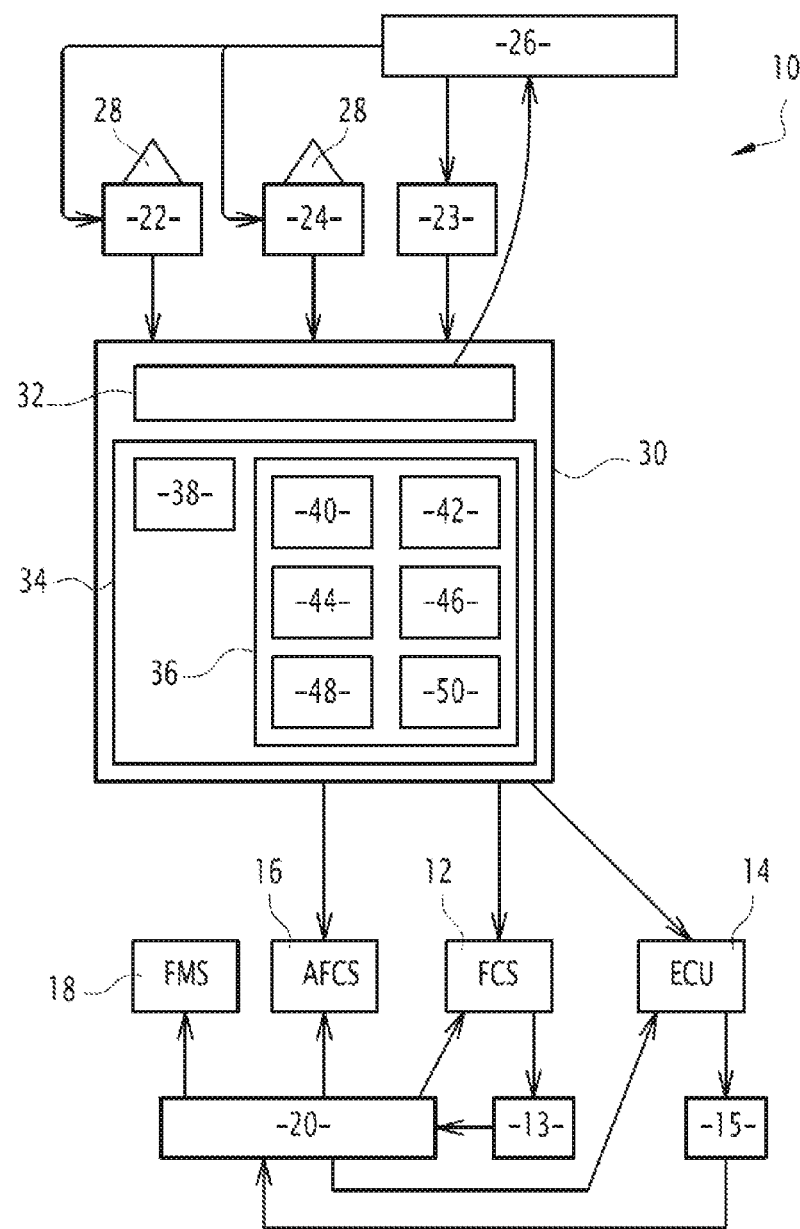
FIG. 1 is a diagrammatic illustration of an aircraft according to an embodiment, the aircraft comprising a flight control system, an engine control unit, an automatic pilot device, a control stick or mini control stick, a rudder bar and a throttle assembly each forming a primary control member able to be manipulated to pilot the aircraft, and an electronic device for generating at least one set point from among a primary set point and a secondary set point, the primary set point being chosen from among the flight control set point for the flight control system and an engine control set point for the engine control unit of the aircraft, the secondary set point being a guidance set point for the automatic pilot, the generating device including means for switching, as a function of the mechanical property acquired for the corresponding primary control member, between a first mode in which one or several primary set points are generated and a second mode in which one or several secondary set points are generated.

In FIG. 1, an aircraft 10, such as an airplane, comprises a flight control system (FCS) 12, to act on a set of control surfaces and actuators 13 of the aircraft, the control surfaces for example being ailerons, elevator ailerons or rudders.

The aircraft 10 comprises an engine control unit (ECU) 14 in order to vary the thrust of reactors 15 of the aircraft.

The aircraft 10 comprises at least one guidance system, such as an automatic pilot (AP) device 16, also called auto-flight control system (AFCS), such as a flight management system (FMS) 18 of the aircraft. Alternatively or additionally, the guidance system is an auto-thrust device, not shown, also called automatic throttle.

The aircraft 10 comprises a set of sensors 20 that measure properties associated with the aircraft 10, in particular properties associated with the set of control surfaces and actuators 13, and send the measured values of the properties to the flight control system 12, the engine control unit 14, the automatic pilot device 16 and/or the flight management system 18.

The aircraft 10 comprises a control stick or mini control stick 22, a rudder bar 23 and a set of throttles 24, each forming a primary control member able to be manipulated by the crew 26 of the aircraft in order to pilot the aircraft. Hereinafter, the term "control stick" will refer indifferently to a control stick or a mini control stick.

Additionally, the aircraft 10 comprises an auxiliary control member 28 making it possible to increment or decrement a set point, in particular a guidance set point, or to designate the value of that set point directly.

The aircraft 10 comprises an electronic device 30 for generating at least one set point from among a primary set point and a secondary set point, the primary set point being chosen from among a flight control set point for the flight control system 12 and an engine control set point for the engine control unit 14, the secondary set point being a guidance set point for the corresponding guidance system, such as the automatic pilot device 16, or the flight management system 18, or the auto-thrust device.

The flight control system 12 is known in itself, and makes it possible, via its action on all of the control surfaces and actuators 13, to cause a change in attitude of the aircraft 10. The flight control system 12 makes it possible to act on the short-term path of the aircraft 10, i.e., the path for a given period of time of up to 30 seconds from the time when the primary control member 22, 24, 25 is manipulated.

The engine control unit 14 is known in itself, and makes it possible to cause a variation in the thrust of the reactors 15 of the aircraft.

The automatic pilot device 16 and/or the auto-thrust device are known in themselves, and make it possible to act on the middle-term path of the aircraft 10, i.e., the path for a period of time from 30 seconds up to several minutes from the manipulation moment of the primary control member 22, 23, 24.

The flight management system 18 is known in itself and is configured for managing a flight plan of the aircraft 10, from takeoff to landing.

The sensors 20 are in particular able to provide information relative to the position of elements of the set of control surfaces and actuators 13, for example the position of the control surface, and/or relative to the status of the reactors 15 and/or relative to high-lift configurations and/or relative to the deployed or retracted state of the landing gear.

The sensors 20 are further able to provide information relative to the position of the aircraft, such as attitudes, accelerations, ground speed, route, altitude, latitude, longitude and/or relative to the environment of the aircraft 10, desirably relative to the atmosphere in which the aircraft 10 is moving, for example a pressure or a temperature.

The control stick 22 is configured for allowing a user to control the attitudes of the aircraft 10. Traditionally, the control stick 22 is configured for being actuated in transverse movements, longitudinal movements, or any combination of transverse and longitudinal movements. In other words, the control stick 22 is movable in at least two different movement directions, the movement directions further being perpendicular to one another in the described example.

More specifically, the control stick 22 is configured for allowing a user to control the roll angle through transverse movements of the control stick 22. Furthermore, the control stick 22 is configured for allowing a user to control the pitch angle through longitudinal movements of the control stick 22.

Figure 2:
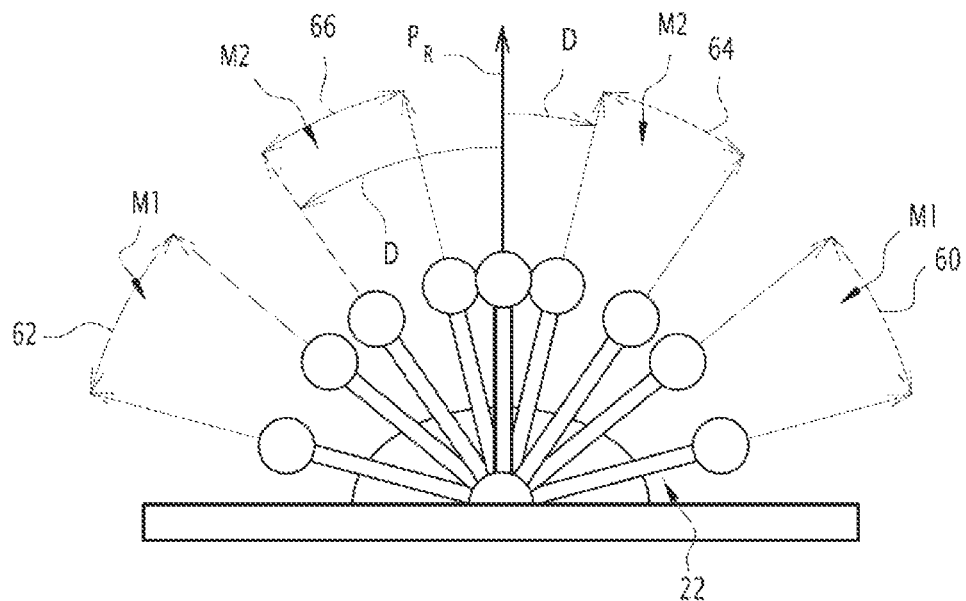
FIG. 2 is a diagrammatic illustration of a first range of values and a second range of values of the acquired mechanical property, when the mechanical property is the position of the control stick of FIG. 1, the switching to the first mode, the second mode, respectively, being done if the value of the mechanical property is in the first range, the second range, respectively.

The control stick 22 includes an idle position, desirably corresponding to the median position between the extreme values of the travel of the control stick in the transverse direction and the longitudinal direction. In FIG. 2, the idle position is the position corresponding to the axis $P_R$.

Additionally, the control stick 22 is a controllable (i.e., steerable) mechanical force feedback member, and a mechanical force feedback law defines the mechanical force supplied by the control stick 22 based on the travel of the control stick relative to its idle position.

The rudder bar 23 is known in itself, and is configured for allowing a user to control the yaw angle of the aircraft 10.

The throttle(s) 24 are configured for creating a variation in the thrust of the reactors 15 of the aircraft via the control system 14. Each throttle 24 is desirably movable in a single movement direction. In other words, each throttle 24 is desirably translatable in that single movement direction.

Additionally, the auxiliary control member 28 is fastened on top of the control stick 22 and the lever(s) 24, and is movable in at least one direction, desirably two directions, in order to increment or decrement a corresponding set point, desirably the corresponding guidance set point. The auxiliary control member 28 for example has a conical shape.

Figure 11:
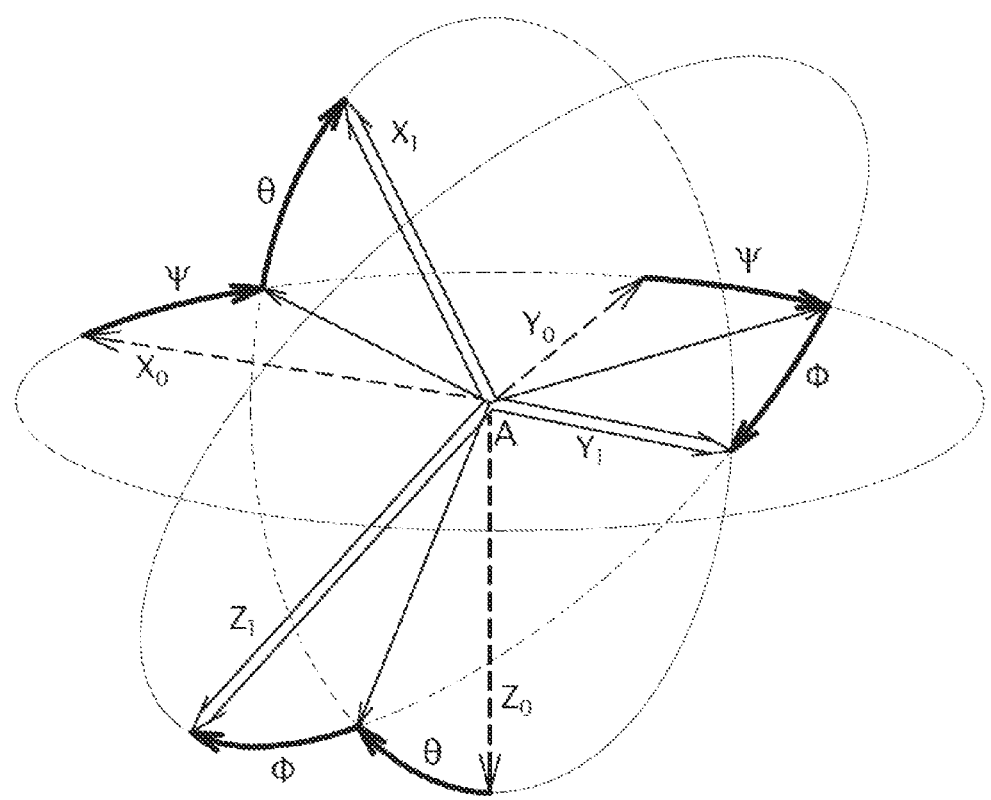
FIG. 11 is a diagrammatic illustration of the projections of the axes of an index related to the aircraft in a reference index.

"Attitudes" generally refer to the oriented angles between the predetermined axes of the aircraft, called aircraft axes, and their projection in reference planes. Among the attitudes, a distinction is made between the roll angle or angle of heel, the pitch angle or attitude, and the heading, known in themselves and recalled below in reference to FIG. 11.

The reference planes are determined from three reference axes.

The aircraft axes and the reference axes are concurrent at a predetermined point A of the aircraft 10, A for example being close to the center of gravity of the aircraft.

The reference axes are the axes of the local land referential and comprise a vertical reference axis $z_0$, a longitudinal reference axis $x_0$ and a transverse reference axis $y_0$, forming a direct orthonormal base $(x_0,y_0,z_0)$ called "reference base".

The vertical reference axis $z_0$ is an axis oriented in the descending direction of the local gravitational field and passing through the predetermined point A of the aircraft. The longitudinal reference axis $x_0$ is an axis oriented in a predetermined direction, for example magnetic or geographical north, and orthogonal to the vertical reference axis $z_0$. The transverse reference axis $y_0$ completes $z_0$ and $x_0$ to form the "reference base".

The vertical $z_0$ and longitudinal $x_0$ reference axes form a vertical reference plane. The transverse $y_0$ and longitudinal $x_0$ reference axes form a horizontal reference plane.

The aircraft axes comprise a longitudinal aircraft axis $x_1$, a vertical aircraft axes $z_1$ and a transverse aircraft axis $y_1$, forming a direct orthonormal base $(x_1,y_1,z_1)$ called "aircraft base".

The longitudinal aircraft axis $x_1$ is an axis oriented toward for the aircraft, passing through the predetermined point A and belonging to a plane of symmetry of the aircraft. The plane of symmetry of the aircraft is generally related to the geometric definition of the airframe of the aircraft, and for example involves the plane passing through the nose of the aircraft and the point A and orthogonal to the plane formed by the airfoil of the aircraft when idle. The transverse aircraft axis $y_1$ is the axes particular to the plane of symmetry and oriented toward the right of the aircraft, i.e., the right of an observer onboard the aircraft and looking toward the front of the aircraft. The vertical aircraft axis $z_1$ completes $y_1$ and $x_1$ to form the "aircraft base".

The angle $\Phi$ between the transverse aircraft axis $y_1$ and the horizontal reference plane is the role angle. The angle $\theta$ between the longitudinal aircraft axis $x_1$ and the horizontal reference plane is the pitch angle. The angle $\psi$ between the longitudinal aircraft axis $x_1$ and the vertical reference plane is the heading. $\Phi$, $\theta$ and $\psi$ are generally called the Euler angles making it possible to go from the index of the aircraft to the reference index.

The generating device 30 comprises a display screen 32 and information processing unit 34 for example made up of a memory 36 and a processor 38 associated with the memory.

In the example of FIG. 1, the generating device 30 is separate from the automatic pilot device 16 and the flight management system 18.

In an alternative that is not shown, the generating device 30 is integrated in flight control system 12. The display screen 32, and the information processing unit 34, respectively, then correspond to the display screen and the information processing unit, respectively, not shown, of the flight control system 12.

In another alternative that is not shown, the generating device 30 is integrated into the automatic pilot device 16. The display screen 32, and the information processing unit 34, respectively, then correspond to the display screen and the information processing unit, respectively, not shown, of the automatic pilot device 16.

In another alternative that is not shown, the generating device 30 is integrated into the flight management system 18. The display screen 32, and the information processing unit 34, respectively, then correspond to the display screen and the information processing unit, respectively, not shown, of the flight management system 18.

The memory 36 is able to store software 40 for acquiring a mechanical property relative to at least one primary control member, such as the control stick 22, the rudder bar 23, the throttle(s) 24, first software 42 for computing at least one primary set point, second software 44 for computing at least one secondary set point, and generating software 46, for the corresponding system from among the flight control system 12, the engine control unit 14 and the guidance system 16, 18, at least one set point computed by the first computation software 42 or the second computation software 44.

According to certain embodiments, the memory 36 is further configured for storing switching software 48, based on the mechanical property acquired for each primary control member 22, 24, between a first mode M1 in which the generating software 46 is configured for generating one or more primary set points, and a second mode M2 in which the generating software 46 is configured for generating one or more secondary set points.

The memory 36 is further configured for storing software 50 for displaying, on the screen 32, information to assist with piloting for the crew 26, in particular the set point(s) generated by the generating software 46.

The processor 38 is able to load and run each of the software programs 40, 42, 44, 46, 48 and 50.

The first mode M1 corresponding to the primary set points is also called MANUAL, and then corresponds to short-term set points. The second mode M2 corresponding to the secondary set points is also called VECTOR mode, and then corresponds to medium-term set points.

The acquisition software 40 is configured for acquiring the mechanical property relative to each primary control member 22, 23, 24, the mechanical property desirably being chosen from among the group including: a position of the corresponding primary control member 22, 23, 24, a movement speed of the corresponding primary member 22, 23, 24 and a mechanical force applied against the corresponding primary control member 22, 23, 24.

The first computation software 42 is configured for computing at least one primary set point as a function of the manipulation of at least one corresponding primary control member 22, 24. An algorithm for computing each primary set point as a function of the manipulation of the corresponding primary member 22, 23, 24 is known in itself, and is not described in more detail.

The first computation software 42 is for example configured for computing a load factor set point, or a pitch speed set point, as a function of the manipulation of the control stick 22 in its longitudinal direction. The load factor set point, or the pitch speed set point, is associated with the vertical aircraft axis.

Similarly, the first computation software 42 is configured for computing a roll rate set point, also called roll speed set point, as a function of the manipulation of the control stick 22 in its transverse direction. The roll rate set point is associated with the transverse aircraft axis.

The first computation software 42 is for example configured for computing a variation set point of the engine rating as a function of the manipulation of the corresponding throttle 24. The engine rating variation set point is associated with the longitudinal aircraft axis.

The second computation software 44 is configured for computing at least one secondary set point as a function of the manipulation of at least one corresponding primary control member 22, 23, 24, and additionally further as a function of the manipulation of the auxiliary control member 28.

The second computation software 44 is for example configured for computing a vertical speed set point Vzc, or a gradient set point, as a function of a manipulation of the control stick 22 in its longitudinal direction. The vertical speed set point Vzc, or the gradient set point, is associated with the vertical aircraft axis $z_1$.

The second computation software 44 is for example configured for computing a roll set point $\phi_c$, or a turn radius set point $R_c$ of the aircraft, as a function of a manipulation of the control stick 22 in its transverse direction. The roll set point $\phi_c$, or the turn radius set point $R_c$, is associated with the transverse aircraft axis $y_1$.

The second computation software 44 is for example able to convert a longitudinal transverse travel acquired from the control stick 22 into a control parameter, according to traditional conversion law.

The second computation software 44 is then able to develop the vertical speed set point $\phi_c$ or the turn radius set point $R_c$, as a function of the position of the aircraft 10 and the control parameter resulting from the previous conversion.

As an example, in the case of the vertical aircraft axis $z_1$, the vertical speed set point Vzc at moment $T_1$ is computed by integrating, between two moments $T_0$ and $T_1$, the control parameter resulting from the prior conversion of the acquired longitudinal travel, then adding that integral to the vertical speed set point Vzc at moment $T_0$.

Advantageously, the gradient set point, also called flight path angle (FPA), is computed based on the vertical speed set point Vzc by means of an estimate of the ground speed Vsol measured using the sensors 20 of the aircraft using the following equation, verified by the FPA gradient:

$$FPA = \arctan\left(\frac{Vzc}{Vsol}\right) \quad (1)$$

Alternatively, the gradient set point is computed first, then the vertical speed set point Vcz.

As an example, in the case of the transverse aircraft axis $y_1$, the roll set point $\phi_c$ at moment $T_1$ is computed by integrating, between two moments $T_0$ and $T_1$, the control parameter resulting from the prior conversion of the acquired transverse travel, then adding that integral to the roll set point $\phi_c$ at moment $T_0$.

Advantageously, the ground turn radius set point $R_c$, is computed based on the roll set point $\phi_c$ previously developed, by means of an estimate of the ground speed $V_{sol}$ measured via the sensors 20 of the aircraft using the following equation:

$$R_c = \frac{V_{sol}^2}{\tan(\varphi_c) \times g} \quad (2)$$

Alternatively, the ground turn radius set point $R_c$, is computed first, then the roll set point $\phi_c$.

The second computation software 44 is for example able to convert a travel of the throttle(s) into an engine control parameter, according to a traditional conversion law. The second computation software 44 is then able to develop a longitudinal velocity set point, as a function of the manipulation of the throttle(s) 24. The longitudinal velocity set point is associated with the longitudinal aircraft axis $x_1$.

As an example, the control parameter is then converted into a gradient acceleration set point via predefined tables depending on the aircraft and its considered configuration. The longitudinal velocity set point at moment $T_1$ is then computed by integrating the gradient acceleration set point between two moments $T_0$ and $T_1$, then adding that integral to the value of the longitudinal set point at moment $T_0$.

The switching software 48 is desirably configured for switching to the first mode M1 when the value of the corresponding acquired mechanical property falls within a first value range, and for switching to the second mode M2 when the value of the corresponding acquired mechanical property falls within a second value range, respectively, the second range being different from the first range. The values of the second range are desirably lower in absolute value than those of the first range, using as convention that the zero value corresponds to the idle position of the corresponding primary member 22, 23, 24.

The second range is desirably separate from the first range, so as to allow the establishment of a hysteresis, to avoid parasitic switchings, or switchings not desired by the user, between the first mode M1 and the second mode M2.

In the example of FIG. 2, the mechanical property taken into account by the generating device 30 is the position of the control stick 22. The first value range is in the form of a first interval 60 and a second interval 62, the first and second intervals 60, 62 desirably being separate and substantially symmetrical relative to the axis $P_R$ corresponding to the idle position of the control stick 22. Similarly, the second value range is in the form of a third interval 64 and a fourth interval 66, the third and fourth intervals 64, 66 desirably being separate and substantially symmetrical relative to the axis $P_R$ associated with the idle position of the control stick 22.

In FIG. 2, the first and second intervals 60, 62 correspond to positions of the control stick 22 further away from the idle position than the positions associated with the third and fourth intervals 64, 66. In other words, by measuring the position of the control stick 22 in the form of an angular deviation, or a travel D, between the position and its idle position, the values of the second range associated with the position of the control stick 22 are smaller in terms of absolute value than those of the first range associated with the position of the control stick 22, with the zero value corresponding to the idle position of the control stick 22. In FIG. 2, the control stick 22 is shown in different positions, in particular in its idle position, with a value of the travel D varying from one position to the next.

Figure 3:
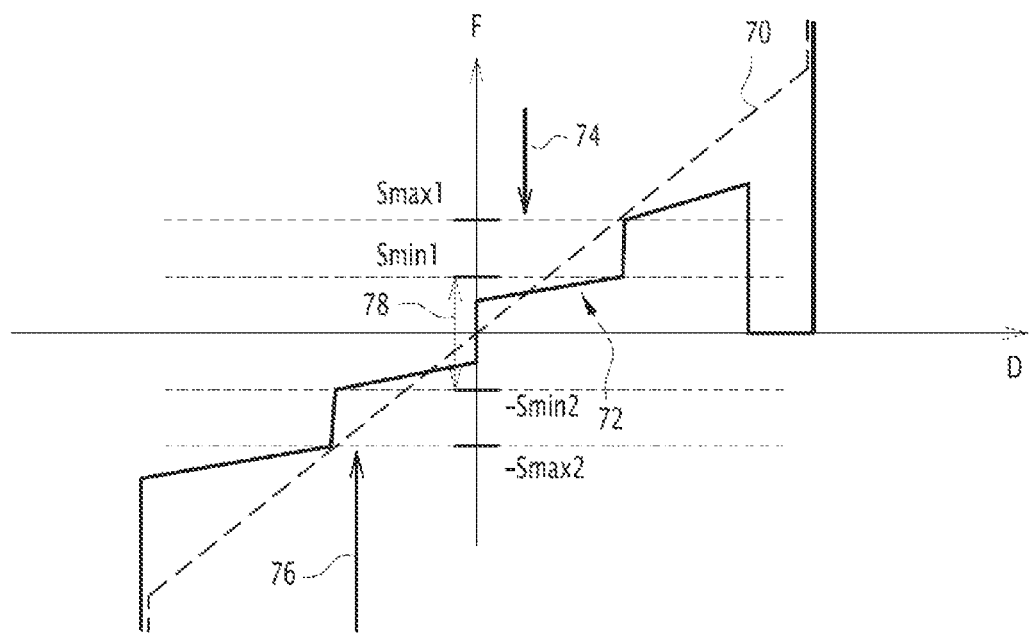
FIG. 3 is a view similar to that of FIG. 2, when the mechanical property is a mechanical force applied against the control stick of FIG. 1.

In the example of FIG. 3, the mechanical property taken into account by the generating device 30 is the mechanical force applied against the control stick 22 in the corresponding direction.

When the control stick 22 is a control stick with a linear force feedback, the movement of the control stick 22 in the corresponding direction is a linear function of the force F applied by the user against the control stick 22, as shown by the curve 70 in dotted lines. The curve 70 shows the variation of the force F as a function of the travel of the control stick 22 with linear force feedback relative to its idle position in the considered direction, and the curve 70 is in the form of a straight line between the extreme travel values of the control stick 22.

When the control stick 22 is a control stick with controllable force feedback, the movement of the control stick 22 is for example a nonlinear function of the force F applied by the user against the control stick 22, as shown by the curve 72 in solid lines. The curve 72 similarly shows the variation of the force F as a function of the travel of the control stick 22 with controllable force feedback relative to its idle position and in the considered direction. The curve 72 then does not correspond to a linear function between the extreme travel values of the control stick 22 with controllable force feedback.

The first range of values associated with the force F applied against the control stick 22 with controllable force feedback is then, for example, in the form of a fifth interval 74 and a sixth interval 76, the fifth and sixth intervals 74, 76 desirably being separate and positioned on either side of the zero value of the force F. In the example of FIG. 3, the fifth interval 74 corresponds to the values of the force F above a threshold Smax1, and the sixth interval 76 corresponds to the values of the force F below a threshold Smax2. The second value range associated with the force F applied against the control stick 22 with controllable force feedback is for example in the form of a seventh interval 78, which corresponds in FIG. 3 to the values of the force F comprised between the thresholds Smin2 and Smin1.

In the example of FIG. 3, the values of the second range associated with the force F are lower in terms of absolute value than those of the first range associated with the force F, with the zero value corresponding to the idle position of the control stick 22.

In the described embodiment, the aircraft 10 includes several primary control members, namely the control stick 22 and the throttles 24, and the acquisition software 40 is then configured for acquiring mechanical properties relative to the plurality of primary control members 22, 24. The switching software 48 is then desirably configured for switching between the first mode M1 and the second mode M2, for each primary control member 22, 24 as a function of the mechanical property acquired for the corresponding primary control member.

In the described embodiment, the control stick 22 is movable in at least two different movement directions, i.e., the longitudinal direction and the transverse direction, and the switching software 48 is then desirably configured for switching between the first mode M1 and the second mode M2, for each movement direction of the control stick 22 and as a function of the mechanical property acquired for the control stick 22 in the corresponding movement direction.

Additionally, the switching software 48 is further configured for allowing the switching from the first mode M1 to the second mode M2 only if the value of at least one aeronautic property from among measurements or estimates of a status vector of the aircraft 10, the first and second derivatives of the measurements or estimates of the status vector, the airspeed of the aircraft 10, the sideslip of the aircraft 10 and the incidence of the aircraft 10, is comprised in a corresponding predetermined value range. The status vector of the aircraft 10 is made up of positions and attitudes of the aircraft 10.

Additionally, when the deviation between the set point and a predetermined reference point is below a predetermined threshold, the generating software 46 is configured for generating the predetermined reference set point. In other words, when the computed set point is close enough to the predetermined reference set point, with a deviation below the predetermined threshold, the predetermined reference set point is generated in place of the computed set point. The generated set point, displayed by the display software 50, is then equal to the predetermined reference set point, which is also displayed on the screen 32, which provides a visual adherence effect of the generated set point and the predetermined reference set point, as will be illustrated in more detail below in light of FIGS. 7 to 9.

Figure 4:
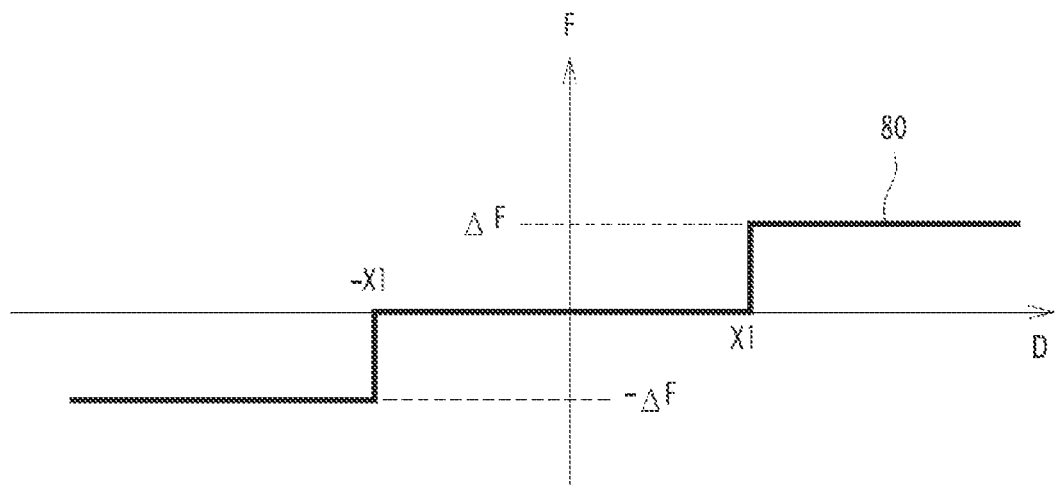
FIG. 4 is a curve showing a nonlinearity designed to be added to a mechanical force feedback law provided by the control stick as a function of the travel of the control stick relative to an idle position, to favor a convergence between the generated set point and a predetermined reference set point.
Figure 5:
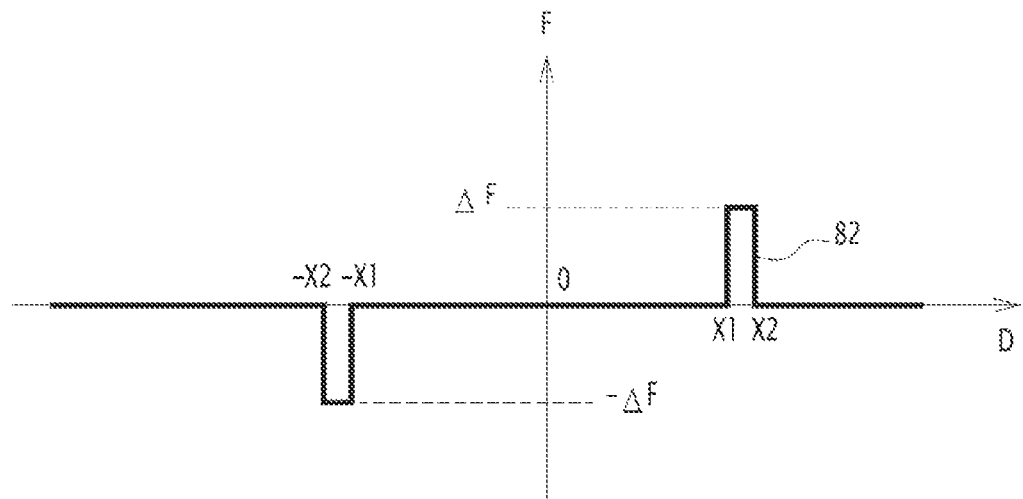
FIG. 5 is a view similar to that of FIG. 4 according to another nonlinearity.

According to this addition, when the control stick 22 is a control stick with controllable force feedback, or steerable force feedback, the law of the mechanical force feedback provided by the control stick 22 as a function of the travel of the control stick relative to its idle position includes at least one nonlinearity, as shown in FIGS. 4 and 5, where curves 80 and 82 show nonlinearities intended to be added to respective force feedback laws. This makes it possible to favor the convergence of the generated set point toward the predetermined reference set point, as will be illustrated in more detail below with respect to FIGS. 7 to 9.

In the described embodiment, both a primary set point and a secondary set point can be computed by the first computation software 42 and the second computation software 44. The switching software 48 is then configured for selecting, among the computed primary set point and the computed secondary set point, the set point corresponding to the mode M1, M2 toward which the switching is done. The generating software 46 is next configured for generating the selected set point. In other words, in this example, the first computation software 42 and the second computation software 44, respectively, are configured for regularly computing primary set points, and secondary set points, respectively, irrespective of the mode selected from among the first mode M1 and the second mode M2.

Figure 6:
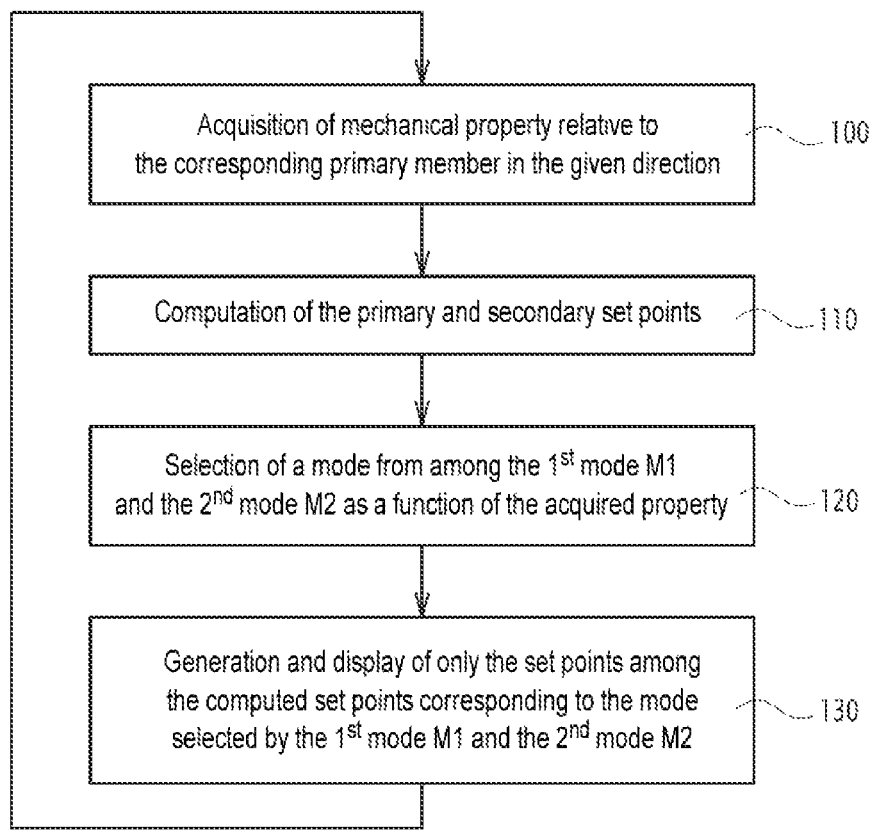
FIG. 6 is a flowchart of a method according to an embodiment for generating at least one set point from among the primary set point and a secondary set point.

The operation of the generating device 30 according to an embodiment will now be described using FIG. 6, showing a flowchart of the generating method according to an embodiment.

During an initial step 100, the generating device 30 begins by using its acquisition software 40 to acquire one or more mechanical properties relative to the corresponding primary control member 22, 23, 24. The mechanical property or properties are desirably chosen from among the group including: the position of the corresponding primary control member 22, 24, the movement speed of the corresponding primary member 22, 24 and the mechanical force applied against the corresponding primary control member 22, 24.

The type of mechanical property, i.e., the position, the movement speed or the applied mechanical force, is for example identical for the control stick 22, in both of its movement directions, and for the throttle 24. Alternatively, the type of mechanical property taken into account is different between the control stick 22 and the throttle 24, the type of mechanical property then being identical in both movement directions of the control stick or different from one movement direction to the other.

It should be noted that the operation of the generating device 30 is no longer correlated between the control stick 22 on the one hand and the throttle 24 on the other hand, and also between each of the movement directions of the control stick 22. The operating method is identical irrespective of the primary control member 22, 24 in question, and irrespective of the movement direction of the considered primary member. The flowchart of FIG. 6 then corresponds to the steps of the generating method carried out for a given movement direction of a given primary control member 22, 24.

During the following step 110, the first computation software 42 and the second computation software 44, respectively, compute the primary set point(s), the secondary set point(s), respectively, in particular as a function of the manipulation of the corresponding primary control member 22, 23, 24 in the considered direction. In other words, during this step 110, both the short-term set points and the medium-term set points are computed by the first and second computation software programs 42, 44.

During step 120, the generating device 30 then determines, via its switching software 48, whether the mechanical property, acquired for the corresponding primary control member 22, 23, 24 in the considered movement direction, corresponds to the first mode M1 or the second mode M2, and selects the corresponding mode from among the first mode M1 and the second mode M2 at the acquired mechanical property. To that end, the switching software 48 for example determines whether the value of the mechanical property belongs to the first value range or the second value range associated with that mechanical property.

Among the computed set point(s), only those corresponding to the selected mode are then, during step 130, generated by the generating software 46, then displayed on the screen 32 by the display software 50. In other words, the mode selection done during step 120 corresponds, in case of variation of the value of the mechanical property corresponding to a mode change, to a switching, as a function of the mechanical property acquired for the corresponding primary control member 22, 23, 24 in the considered movement direction, between the first mode M1, in which the primary set point(s) are generated, and the second mode M2, in which the secondary set point(s) are generated.

Figure 7:
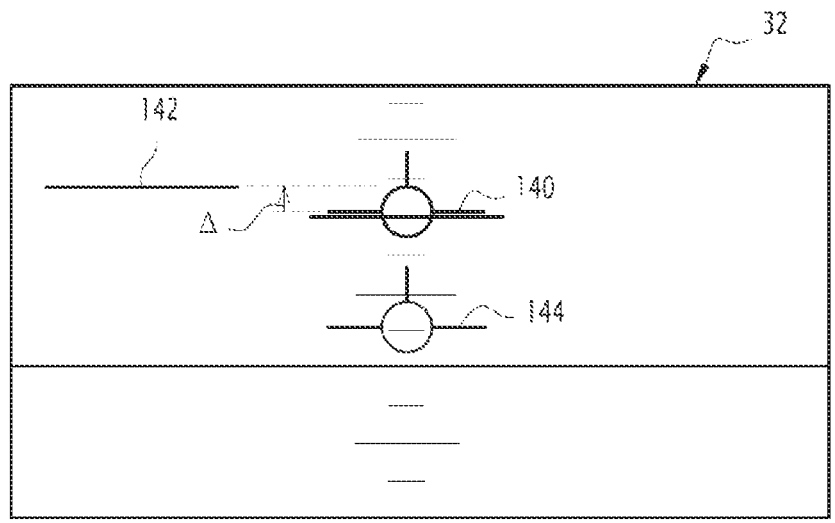
FIG. 7 is a diagrammatic illustration of information displayed on a screen of the generating device of FIG. 1.

In the example of FIG. 7, a generated gradient set point 140 and a predetermined reference gradient set point 142 are displayed on the screen 32, and are spaced apart from one another by an algebraic deviation A. In FIG. 7, a current speed vector 144 of the aircraft 10 is also displayed.

Figure 8:
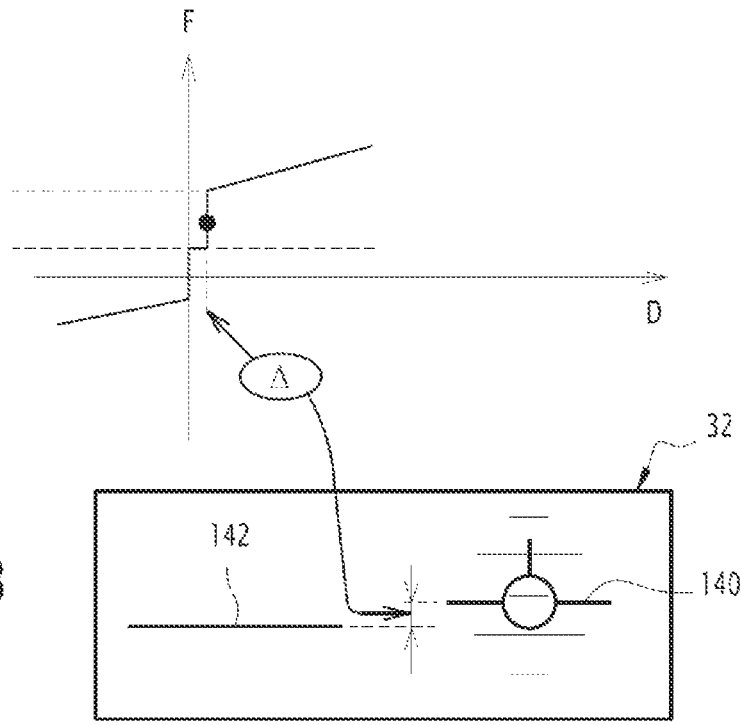
FIGS. 8 and 9 are diagrammatic illustrations of the evolution of the deviation between the set point displayed on the screen and the predetermined reference set point, when a mechanical force is applied against the control stick.
Figure 9:
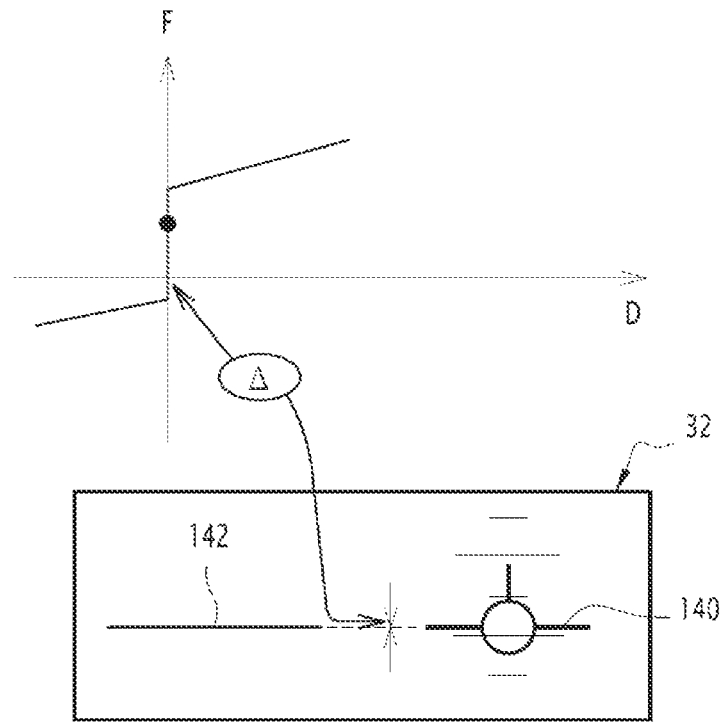

FIGS. 8 and 9 illustrate the variation of the value of the algebraic deviation A between the generated gradient set point 140 and the predetermined reference gradient set point 142. These figures in particular show the decrease, from the example of FIG. 7 to the example of FIG. 9, of the value of the algebraic deviation A, until it becomes lower than the predetermined threshold and the generated gradient set point 140 is then equal to the predetermined reference gradient set point 142, as shown in FIG. 9. The visual adherence effect of the generated set point 140 with respect to the predetermined reference set point 142 is further made easier by the nonlinearity added to the nominal law of the mechanical force feedback of the control stick 22, as shown in FIGS. 8 and 9.

In other words, when the computed set point is close enough to the predetermined reference set point, with a deviation below the predetermined threshold, the predetermined reference set point is generated in place of the computed set point. The generated set point, displayed by the display software 50, is then equal to the predetermined reference set point, which is also displayed on the screen 32, which provides a visual adherence effect of the generated set point and the predetermined reference set point, as will be illustrated in more detail below in light of FIGS. 7 to 9.

At the end of step 130, the generating device 30 returns to step 100, in order to acquire a new value of the mechanical property associated with corresponding primary control member 22, 24 and depending on the considered movement direction, to again determine whether a switching between the first mode M1 and the second mode M2 is necessary.

Thus, the manipulation of a same control member, i.e., the corresponding primary control member, such as the control stick or the throttle, allows easy switching between the first operating mode M1, also called MANUAL mode, in which primary set points are generated, and the second operating mode M2, also called VECTOR mode, in which secondary set points are generated. The only set points generated are then those corresponding to the mode among the first mode M1 and the second mode M2 toward which the switching has been done, i.e., those corresponding to the mode selected from among the first mode M1 and the second mode M2.

Following that switching, the value of the associated set point can be modified as needed by the crew 26 using the corresponding primary control member 22, 24, and additionally, optionally, via the connected control member 28.

This switching between the first mode M1 and the second mode M2 is further done for each primary control member 22, 23, 24, and independently from one primary control members to the other, when the aircraft 10 includes several primary control members 22, 23, 24, such as the control stick 22, the rudder bar 23 and the throttle(s) 24.

This switching between the first mode M1 and the second mode M2 is further done for each movement direction of the corresponding primary member when the primary control member, such as the control stick 22, is movable in at least two different movement directions.

The generating device 30 according to certain embodiments is particularly simple for the crew 26 to use, while being easy to configure, with one type of mechanical property, taken into account to determine the switching, that is variable from one primary control member to the other, or from one movement direction to the other for a given primary control member.

Figure 10:
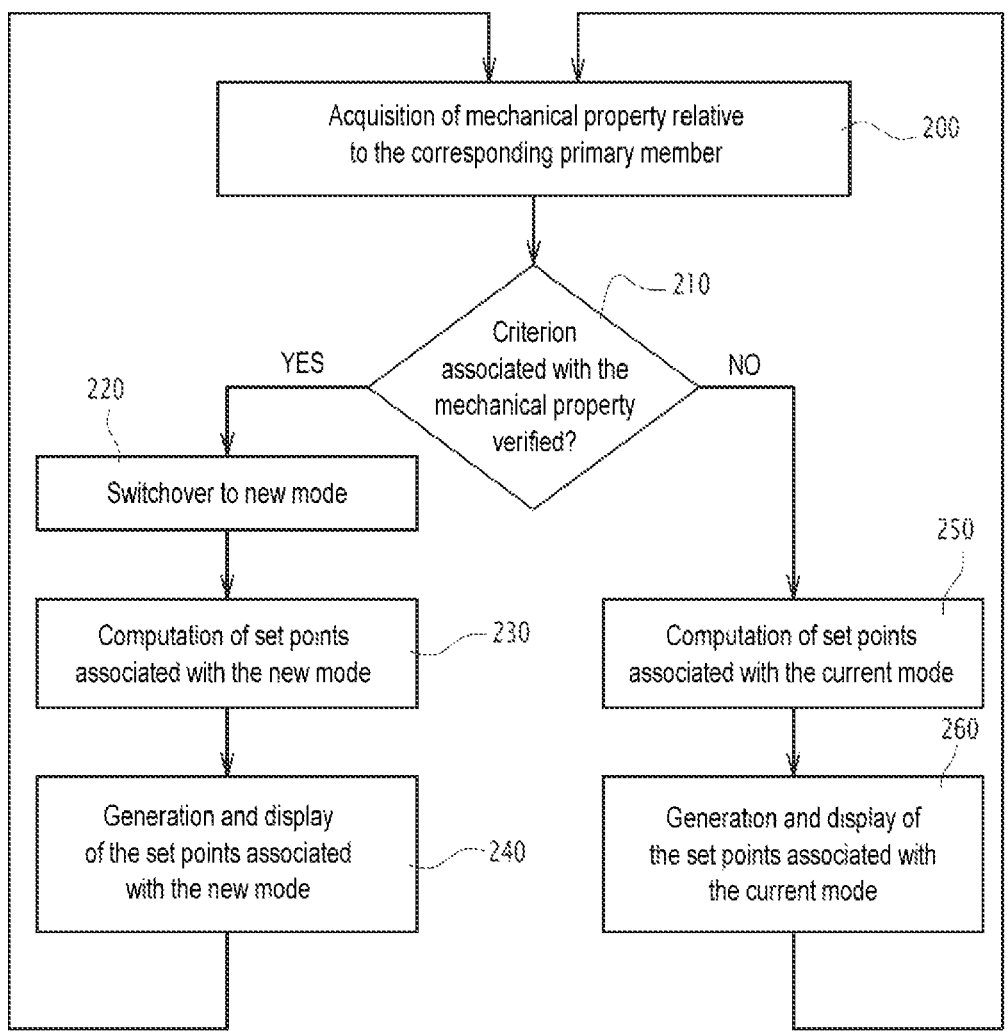
FIG. 10 is a view similar to that of FIG. 6 according to a second embodiment.

FIG. 10 illustrates a second embodiment, in which the elements identical to the first embodiment previously described are identified using the same references, and are not described again.

According to this second embodiment, the switching software 48 is configured for controlling the computation, via the first computation software 42 or the second computation software 44, of set points corresponding to the mode from among the first mode M1 and the second mode M2 toward which the switching has been done. In other words, according to this alternative, only the software, which from among the first computation software 40 and the second computation software 44 corresponds to the mode among the first mode M1 and the second mode M2 toward which the switching has been done, is authorized to compute set points.

The other aspects of the first embodiment are identical for this second embodiment.

The operation of the generating device 30 according to this second embodiment will now be described using FIG. 10, showing a flowchart of the generating method according to this second embodiment.

During an initial step 200, the generating device 30 begins by using its acquisition software 40 to acquire the mechanical property or properties relative to the corresponding primary control member 22, 24. The mechanical property or properties are desirably chosen from among the group including: the position of the corresponding primary control member 22, 24, the movement speed of the corresponding primary member 22, 24 and the mechanical force applied against the corresponding primary control member 22, 24.

Similarly to the first embodiment, the type of mechanical property, i.e., the position, the movement speed or the applied mechanical force, is for example identical for the control stick 22, in both of its movement directions, and for the gas throttles 24. Alternatively, the type of mechanical property taken into account is different between the control stick 22 and the throttles 24, the type of mechanical property then being identical in both movement directions of the control stick or different from one movement direction to the other.

According to this second embodiment, the operation of the generating device 30 is also no longer correlated between the control stick 22 on the one hand and the throttles 24 on the other hand, and also between each of the movement directions of the control stick 22. The operating method is identical irrespective of the primary control member 22, 23, 24 in question, and irrespective of the movement direction of the considered primary member. The flowchart of FIG. 10 then corresponds to the steps of the generating method carried out for a given movement direction of a given primary control member 22, 23, 24.

During the following step 210, the generating device 30 then determines, via its switching software 48, whether the mechanical property, acquired for the corresponding primary control member 22, 24 in the considered movement direction, corresponds to the first mode M1, in which the primary set points are generated, or the second mode M2, in which secondary set points are generated. To that end, the switching software 48 for example determines whether the value of the mechanical property belongs to the first value range or the second value range associated with that mechanical property.

When the switching software 48 observes a variation value of the mechanical property corresponding to a mode change, it goes to step 220 in order to switch from the current mode to the other mode, also called new mode, among the first mode M1 and the second mode M2.

The corresponding computation software from among the first computation software 42 and the second computation software 44 then computes, during the following step 230, the set point(s) from among the primary set points and the secondary set points corresponding to the new mode toward which the switching has been done.

The computed set point(s) for the new mode are then, during step 240, generated by the generating software 46, then displayed on the screen 32 by the display software 50.

During step 210, if the switching software 48 observes that the acquired mechanical property still corresponds to the same mode, i.e., the current mode, from among the first mode M1 and the second mode M2, it goes on to step 250.

During step 250, the corresponding computation software from among the first computation software 42 and the second computation software 44 computes the set point(s) from among the primary set points and the secondary set points corresponding to the current mode.

The set point(s) computed for the current mode are next, during step 260, generated by the generating software 46, then displayed on the screen 32 by the display software 50.

At the end of step 240 or step 260, the generating device 30 returns to step 200, in order to acquire a new value of the mechanical property associated with the corresponding primary control member 22, 24 and in the considered movement direction, to again determine whether a switching between the first mode M1 and the second mode M2 is necessary.

The advantages of the second embodiment are similar to those of the first embodiment, described previously, and are not described again.

One can thus see that the method and the device 30 according to certain embodiment, for generating at least one set point among a primary set point a secondary set point, make it possible to facilitate, for the crew 26, the development of flight control set points, engine control set points and guidance set points, while limiting the number of control members 22, 23, 24 associated with that development of the set points.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for generating at least one set point from among a primary set point and a secondary set point, the primary set point being chosen from among a flight control set point for a flight control system of an aircraft and an engine control set point for an engine control unit of the aircraft, the secondary set point being a guidance set point for a guidance system of the aircraft, the aircraft comprising the flight control system, the engine control unit, at least one guidance system, at least one primary control member, and an electronic device for generating the set point(s), the primary control member being configured to be manipulated by a user to pilot the aircraft, the primary control member being selected from the group including: a control stick, a mini control stick, a rudder bar and a throttle, the method being implemented by the generating device and comprising:

acquiring a mechanical property relative to at least one corresponding primary control member;

computing at least one set point from among one or more primary set points and one or more secondary set points;

generating at least one of the computed set point(s), for the corresponding system from among the flight control system, the engine control unit and the guidance system; and switching, based on the mechanical property acquired for the corresponding primary control member, between a first mode in which one or more primary set points are generated and a second mode in which one or more secondary set points are generated.

2. The method of claim 1, wherein the aircraft comprises a plurality of primary control members, the method further comprising acquiring mechanical properties for the plurality of primary control members, and wherein the switching between the first mode and the second mode is done for each primary control member and as a function of the mechanical property acquired for the corresponding primary control member.

3. The method of claim 1, wherein at least one primary control member is movable in at least two different movement directions, and the switching between the first mode and the second mode is done for each movement direction of the corresponding primary member and as a function of the mechanical property acquired for the member in the corresponding movement direction.

4. The method of claim 1, wherein both a primary set point and a secondary set point are computed during the computation step, and the switching between the first mode and the second mode is done via the selection, by the computed primary set point and the computed secondary set point, of the set point corresponding to the mode toward which the switching is done, then via the generation of the selected set point.

5. The method of claim 1, wherein the switching to the first mode, the second mode, respectively, is done for a first range of values of the acquired mechanical property and a second value range of the mechanical property, respectively, the second range being different from the first range.

6. The method of claim 5, wherein the second range is separate from the first range.

7. The method of claim 5, wherein the values of the second range are lower than those of the first range.

8. The method of claim 1, wherein the mechanical property is a property selected from the group including: a position of the corresponding primary control member, a movement speed of the corresponding primary member and a mechanical force applied against the corresponding primary control member.

9. The method of claim 1, wherein the method further comprises determining at least one aeronautic property from among a position of the aircraft, attitudes of the aircraft, order 1 and 2 time derivatives of the position and attitudes, and the airspeed of the aircraft and the angle of attack of the aircraft, and wherein the switching from the first mode to the second mode is authorized only if the value of each determined property is comprised in a corresponding predetermined value range.

10. The method of claim 1, wherein during the generating, if the deviation between the computed set point and a predetermined reference set point is below a predetermined threshold, then the generated set point is the predetermined reference set point.

11. The method of claim 1, wherein at least one primary control member is a member with controllable mechanical force feedback, and the law of the mechanical force feedback supplied by the corresponding primary member as a function of the travel of the primary member relative to an idle position includes at least one nonlinearity, to favor the convergence of the generated set point toward a predetermined reference set point.

12. The method of claim 1, wherein each guidance system is an element selected from the group including: an automatic pilot device, an auto-thrust device and a flight management system of the aircraft.

13. A computer-readable medium including a non-transitory computer program product including software instructions which, when implemented by a computer, implement the method of claim 1.

14. An electronic device for generating at least one set point from among a primary set point and a secondary set point, the primary set point being chosen from among a flight control set point for a flight control system of an aircraft and an engine control set point for an engine control unit of the aircraft, the secondary set point being a guidance set point for a guidance system of the aircraft, the device comprising:

an acquiring capability for acquiring a mechanical property relative to at least one primary control member, each primary control member being able to be manipulated by a user to pilot the aircraft, each primary control member being selected from the group including: a control stick, a mini control stick, a rudder bar and a throttle;

a first module for computing at least one primary set point;

a second module for computing at least one secondary set point; and a generating module for generating, to the corresponding system from among the flight control system and the guidance system, at least one set point computed by a module from among the first computation module and the second computation module, wherein the device further comprises a switching capability for switching, based on the mechanical property acquired for each primary control member, between a first mode in which the generating module is configured for generating one or more primary set points, and a second mode in which the generating module is configured for generating one or more secondary set points.

15. An aircraft comprising:

a flight control system;

an engine control unit;

at least one guidance system;

at least one primary control member, each primary control member being able to be manipulated by a user to pilot the aircraft, each primary control member being selected from the group including: a control stick, a mini control stick, a rudder bar and a throttle; and an electronic device for generating at least one set point from among a primary set point and a secondary set point, the primary set point being chosen from among a flight control set point for a flight control system and an engine control set point for an engine control unit of the aircraft, the secondary set point being a guidance set point for a guidance system of the aircraft, wherein the generating device is according to claim 14.

16. The aircraft of claim 15, wherein each guidance system is selected from the group including: an automatic pilot device, an auto-thrust device and a flight management system of the aircraft.

17. A method for generating at least one set point from among a primary set point and a secondary set point, the primary set point being chosen from among a flight control set point for a flight control system of an aircraft and an engine control set point for an engine control unit of the aircraft, the secondary set point being a guidance set point for a guidance system of the aircraft, the aircraft comprising the flight control system, the engine control unit, at least one guidance system, at least one primary control member, and an electronic device for generating the set point(s), the primary control member being configured to be manipulated by a user to pilot the aircraft, the primary control member being selected from the group including: a control stick, a mini control stick, a rudder bar and a throttle, the method being implemented by the generating device and comprising:

acquiring a mechanical property relative to at least one corresponding primary control member, wherein the mechanical property relative to the at least one corresponding primary control member is selected from the following: a position of the corresponding primary control member, a movement speed of the corresponding primary control member and a mechanical force applied against the corresponding primary control member;

computing at least one set point from among one or more primary set points and one or more secondary set points;

generating at least one of the computed set point(s), for the corresponding system from among the flight control system, the engine control unit and the guidance system; and switching, based on the mechanical property acquired for the corresponding primary control member, between a first mode in which one or more primary set points are generated and a second mode in which one or more secondary set points are generated.

* * * * *